Dec. 1, 1953  L. McGIHON  2,661,037
COMPOUND WOODWORKING TOOL WITH VARIABLE DRIVE
Filed Nov. 29, 1948
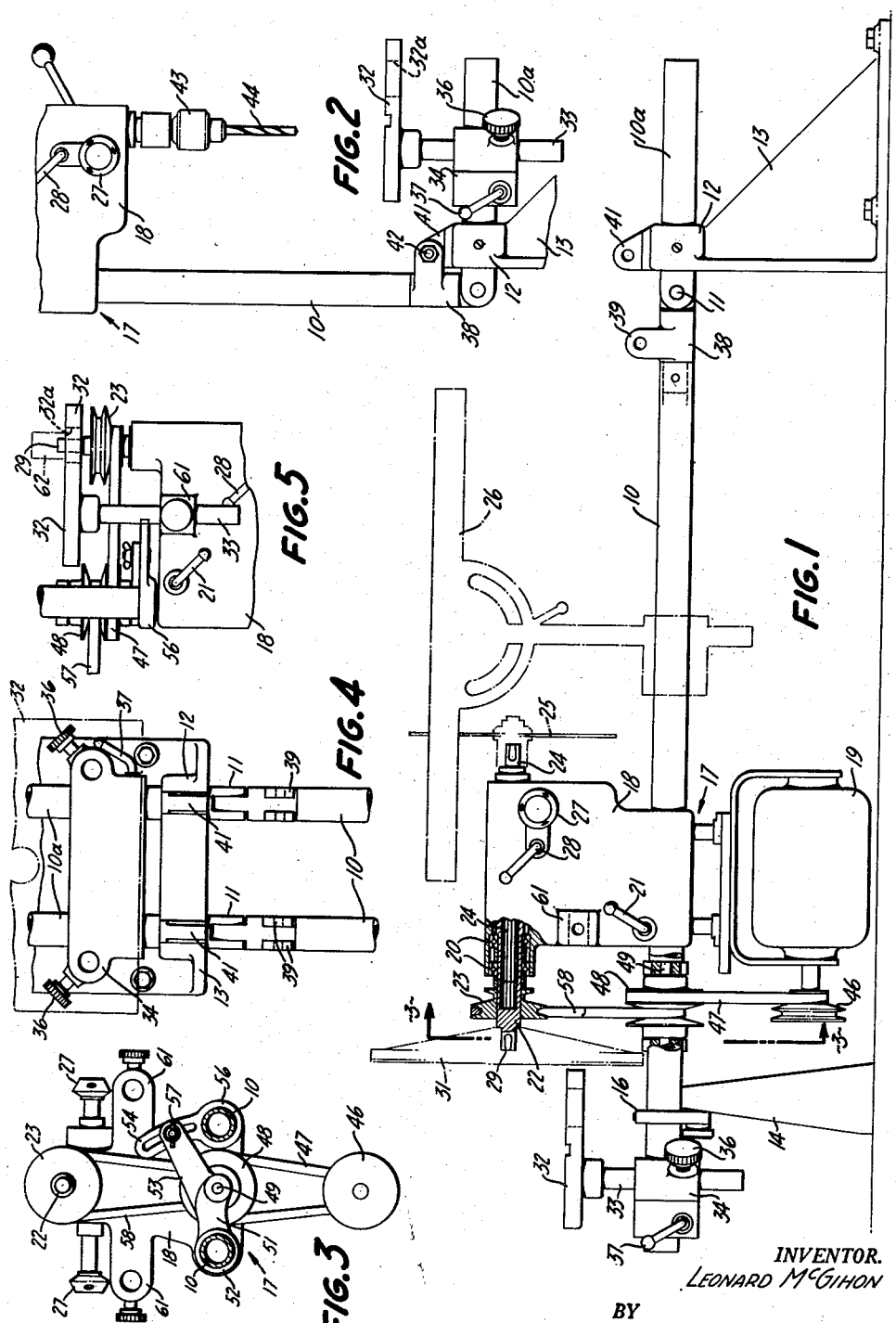
INVENTOR.
LEONARD McGIHON
BY
ATTORNEY Patented Dec. 1, 1953

2,661,037

UNITED STATES PATENT OFFICE 2,661,037

COMPOUND WOODWORKING TOOL WITH VARIABLE DRIVE

Leonard McGihon, San Leandro, Calif., assignor to King Sales & Engineering Co., San Francisco, Calif., a corporation of California, as trustee Application November 29, 1948, Serial No. 62,489

2 Claims. (Cl. 144—1)

The instant invention relates to a combination woodworking tool and is concerned more particularly with a tool of this character which is versatile in use and can be easily adjusted between various working conditions and speeds.

In tools of this character adapted for use as a lathe, a saw, a sander, a horizontal drill press, a vertical drill press, a jig saw, etc., the ease of adjustment of the tool to and from the various adaptations and the ease of adjustment of the drive speed desired for the various uses of the tool are important.

In the instant invention a tool is provided including support rods which are hinged to be moved between horizontal and vertical positions, a power and tool assembly mounted for sliding movement on the rods and provided with a double-ended spindle for adaptation to various uses in the horizontal and vertical positions thereof. The power and tool assembly includes a variable drive from the motor of the power unit to the spindle of the tool unit which can be easily adjusted through different selected speed ranges.

Referring to the drawings, Figure 1 is a side elevational view of the tool with certain parts broken away and shown in section for better illustration of their construction.

Figure 2 is a side elevational view of the tool as adjusted to provide a vertical drill press.

Figure 3 is a sectional view of the drive assembly taken as indicated by the line 3—3 in Figure 1.

Figure 4 is a plan view of the tool support illustrating the hinged connection of the sectional support rods.

Figure 5 is a view of the drive unit positioned as shown in Figure 2 and showing a different arrangement of the drive belts from that illustrated in Figure 1.

Referring to Figures 1 and 4, the tool includes a pair of parallel sectional support tubes or rods 10—10a having respective hinged connections at 11. The sections 10a of the rods are received in respective bosses 12 of a support 13 and are secured therein as by set screws. The sections 10 of the rod adjacent their opposite ends rest freely upon a support member 14 to which the rods may be secured by conventional clamping bracket 16 when they are to be used in their horizontal position. Slidably mounted upon the rods 10 is a tool and power assembly 17 comprising a tool unit 18 slidably engaged with the rods 10 and a power unit or motor 19 adjustably carried by the tool unit 18 in any desirable manner. The unit 18 may be clamped to the rods 10 in any selected adjusted position by suitable clamping means controlled by a handle 21. The spindle assembly of the tool unit 18 comprises a counterbored driving shaft 22 (Figure 1) carried by conventional bearings 20 within the casing and on which a double pulley 23 is mounted. The shaft 22 has a splined or other suitable sliding driving connection with a spindle shaft 24 which projects at one end of the tool unit 18 and is adapted for mounting of tools such as the saw 25 shown in position thereon in phantom lines with respect to a saw table 26 mounted on the rods 10. The in and out movement of the shaft 24 is controlled by a suitable rack and pinion arrangement operated by a control knob 27 and having a clamping element 28 associated therewith so that it can be locked in adjusted position. The projecting end of the shaft 22 forms a second spindle element 29 which is adapted to receive a tool such as a sanding disk 31, also shown in phantom lines. The sanding disk 31 is operatively related to a work table 32 whose parallel support rods 33 may be slidably adjusted with respect to a support bracket 34 and held in adjustment by means of clamping screws 36. The bracket 34 can be clamped in adjusted position on the rods 10 by conventional clamping means having a control handle 37.

Referring to Figure 2 where the tool is illustrated in position as a drill press, respective hinge elements 38 on the rods 10 have projecting parallel ears 39 which are apertured and in the position shown in Figure 2 register with upstanding apertured ears 41 on the respective collars 12 so that fastening bolts or studs 42 can be inserted therein to hold the sections 10 of the rods in upright position as shown in Figure 2. In this condition of the parts the table 32 and its support bracket 34 are mounted on the ends of the rods which project beyond the support member 13. Also a conventional form of Jacob's chuck 43 is secured on the end of the spindle shaft 24 for holding a tool such as the drill 44.

The drive connection from the motor 19 to the tool unit 18 provides by a simple adjustment two speed ranges within which it is infinitely variable. In the position shown in Figures 1 and 3 the shaft of the motor 19 carries a double pulley assembly 46, the smaller one of which is connected by a V-belt 47 with one side of a pair of variable drive pulleys 48 of conventional construction, as shown for example in the patent to Shaw 2,235,122 dated March 18, 1941. The pulleys 48 are carried by a countershaft 49 which is supported by a pair of spaced arms 51 from a boss 52 slidably engaged on one of the rod sections 10. One of the arms 51 is provided with an apertured extension 53 which cooperates with an arcuate slotted arm 54 of a boss 56 slidable on the other section 10 and can be clamped thereto by a bolt 57. By adjusting the arm 53 with respect to the slotted arm 54 the respective distances of the variable pulley assembly 48 with respect to the motor pulley 46 and the spindle pulley 23 can be adjusted and thereby adjust the respective effective diameters of the two sections of the variable drive pulley unit 48. As shown in Figure 1, the small pulley of the assembly 46 drives through the belt 47 to the variable pulley assembly 48 which is in turn connected by the belt 58 to the large pulley of the assembly 23. This provides a variable drive adjustment within a low speed range. In Figure 5 the belt 47 extends between the small pulley of the pulley assembly 23 to the variable drive assembly, which is connected by the belt 57 to the large pulley of the assembly 46, so that a variable speed drive in a high speed range is provided.

As an example of the speed ranges provided by the above drive arrangement and assuming the small pulley diameter in each case to be one and one-half inches and the large pulley diameter three inches with a motor speed of 1800 R. P. M., the belt arrangement shown in Figure 1 provides a variable speed drive between a low speed of 450 R. P. M. and a high speed of 1800 R. P. M. The belt arrangement shown in Figure 5 provides a variable drive between a low speed of 1800 R. P. M. and a high speed of 7200 R. P. M.

With respect to Figure 5, it will be noted that the table 32 is mounted in a pair of similar apertured bosses 61 only one of which is shown formed at the respective sides of the tool unit 18. The table aperture 32a engages over the spindle 29 on which a routing tool 62 can be mounted for engagement with work moved over the table 32.

From the above description it will be noted that the tool as described is capable of many uses and is very flexible in its adaptation for various uses. While the assembly as shown in the drawings shows the tool unit 18 toward the left end of the supporting rods 10, it can be adjusted toward the right and the cooperating bracket or table be mounted on the rods 10 at its left. This enables the use of either of the spindles 24 or 29 in a lathe set-up or for use with a saw or the sanding disk. Also, by readjustment of the relative positions of the support bracket 14 and the tool unit 18, the tool unit 18 can be placed to the left of this support bracket in an outboard mounting where the diameter of tool employed is too great to clear the rods 10. Many other adaptations and adjustments of the tool are obvious from the description.

While I have shown certain preferred embodiments of the invention, it will be seen that the invention is capable of variation and modification from the form shown so that its scope should be limited only by the scope of the claims appended hereto.

I claim:

1. A combination tool comprising a pair of parallel support rods, support members adjacent the respective ends of said rods, a tool unit slidably mounted on said rods comprising a spindle assembly above said rods, a motor below said rods and a variable drive connection therebetween; said connection including a single pulley at said spindle assembly, a single pulley at said motor, a pair of variable diameter pulley units, respective belts connecting said units respectively to said respective single pulleys, said pair of variable diameter pulley units being axially aligned and disposed between said support rods, and means for mounting said pulley units comprising a pivotal support means on one of said support rods and an adjustable connection to the other of said support rods.

2. A combination tool comprising a pair of parallel support rods, support members adjacent the respective ends of said rods, a tool unit slidably mounted on said rods comprising a spindle assembly above said rods, a motor below said rods and a variable drive connection therebetween; said connection including a single pulley at said spindle assembly, a single pulley at said motor, a pair of variable diameter pulley units, respective belts connecting said units respectively to said respective single pulleys, said pair of variable diameter pulley units being axially aligned and disposed between said support rods, and means for mounting said pulley units comprising a mounting member supporting said pulley units and carried by one of said rods for pivoting and sliding movement, a second member carried by the other of said rods, and an adjustable connection between said members.

LEONARD McGIHON.

References Cited in the file of this patent

UNITED STATES PATENTS

| Number | Name | Date |
|---|---|---|
| 1,524,224 | Werner | Jan. 27, 1925 |
| 1,999,625 | Cammack | Apr. 30, 1935 |
| 2,013,778 | Halvorsen et al. | Sept. 10, 1935 |
| 2,071,201 | Frech | Feb. 16, 1937 |
| 2,089,362 | Haas | Aug. 10, 1937 |
| 2,105,009 | Roebuck | Jan. 11, 1938 |
| 2,151,688 | Carey | Mar. 28, 1939 |
| 2,200,799 | Miller | May 14, 1940 |
| 2,235,122 | Shaw | Mar. 18, 1941 |
| 2,259,899 | Long | Oct. 21, 1941 |
| 2,517,608 | Taylor | Aug. 8, 1950 |